United States Patent [19]
Krell, Jr.

[11] Patent Number: 6,074,122
[45] Date of Patent: Jun. 13, 2000

[54] CONE DRIVE POWER TRAIN CONNECTION

[75] Inventor: Alvin Krell, Jr., Springfield, Ill.

[73] Assignee: Caterpillar Inc., Peoria, Ill.

[21] Appl. No.: 08/990,588

[22] Filed: Dec. 15, 1997

[51] Int. Cl.[7] ............................................. F16O 3/52
[52] U.S. Cl. ..................... 403/370; 403/374.4; 403/21; 464/98; 192/70.16
[58] Field of Search ...................... 403/370, 371, 403/368, 374.1, 374.3, 374.4, 373, 21, 409.1; 464/98, 93, 99, 100; 192/70.16, 200

[56] References Cited

U.S. PATENT DOCUMENTS

| | | |
|---|---|---|
| 2,842,233 | 7/1958 | Greenleaf . |
| 3,367,274 | 2/1968 | Lombard . |
| 3,720,429 | 3/1973 | Friedrichs et al. . |
| 4,428,275 | 1/1984 | Huperz et al. ................. 403/374.4 |
| 4,708,692 | 11/1987 | Weiss ................................. 464/69 |
| 4,737,136 | 4/1988 | Federn ................................ 464/99 |
| 4,828,441 | 5/1989 | Frasca ................................. 403/21 |
| 5,123,771 | 6/1992 | Okuno ................................ 403/369 |
| 5,360,087 | 11/1994 | Wiebelhaus et al. ........... 192/70.16 X |
| 5,370,472 | 12/1994 | Muellenberg ...................... 403/370 |
| 5,514,038 | 5/1996 | Harpin ................................. 464/93 |
| 5,538,356 | 7/1996 | Aarre et al. ....................... 403/371 |

FOREIGN PATENT DOCUMENTS

| | | | |
|---|---|---|---|
| 0816703 | 1/1998 | European Pat. Off. | ......... F16D 3/79 |
| 1379512 | 3/1988 | Russian Federation | ............ 464/99 |
| 4943 | of 1883 | United Kingdom | ............ 464/98 |
| 432034 | 7/1935 | United Kingdom . | |
| 2222865 | 3/1990 | United Kingdom | ....... F16D 3/52 |
| 2311118 | 9/1997 | United Kingdom | ....... F16D 3/79 |

*Primary Examiner*—Anthony Knight
*Assistant Examiner*—David E. Bochna
*Attorney, Agent, or Firm*—Calvin E. Glastetter

[57] ABSTRACT

A cone drive apparatus includes a conical drive assembly which aligns and drivingly engages between an engine and a transmission. The conical drive assembly is fastened to a flex plate which is connected to an output member of an engine. The conical drive assembly aligns with a conical recess in an adapter plate fastened to an input member of a transmission. Once the engine and transmission are aligned and suitably fastened together, the conical drive assembly drivingly engages the output member of the engine to the input member of the transmission.

8 Claims, 3 Drawing Sheets

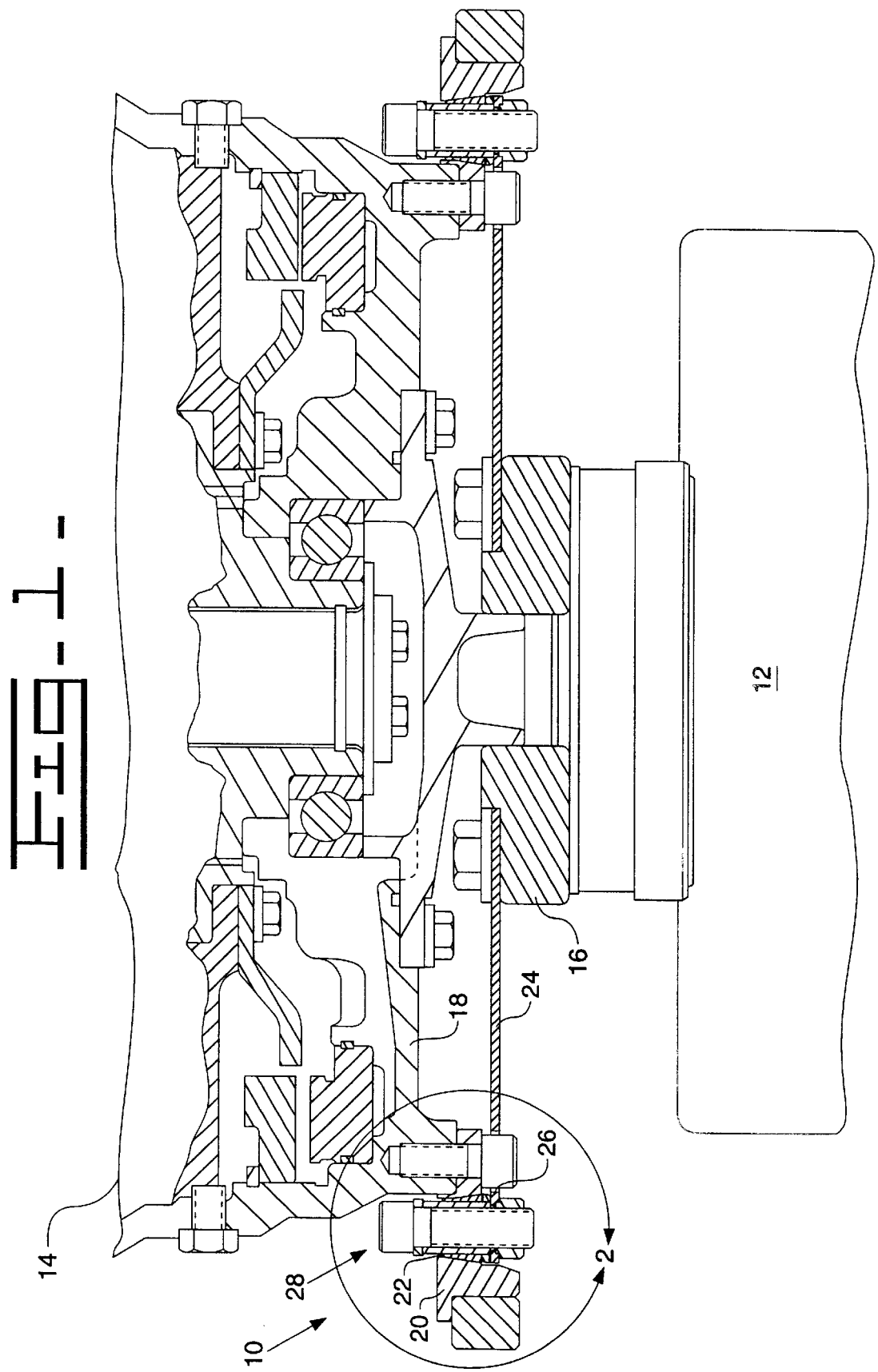

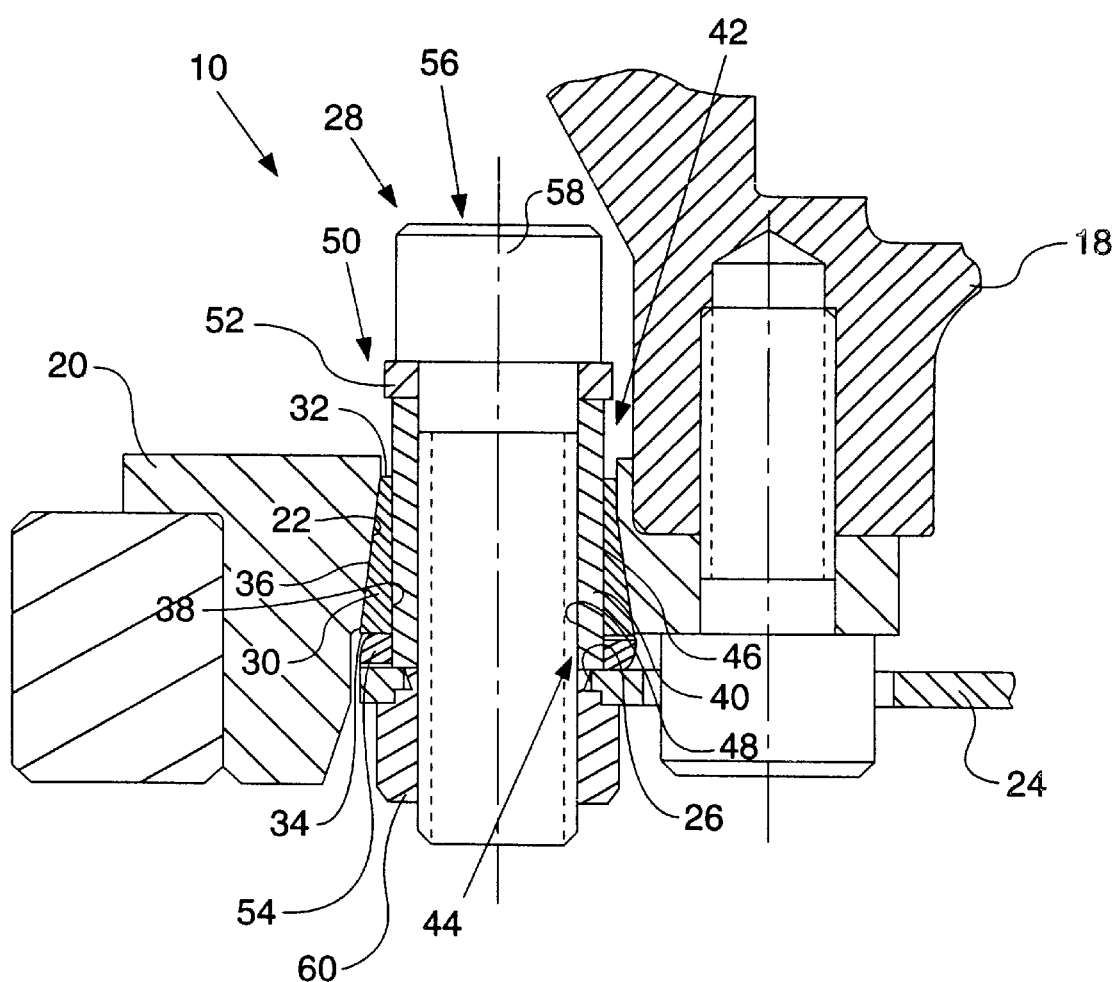

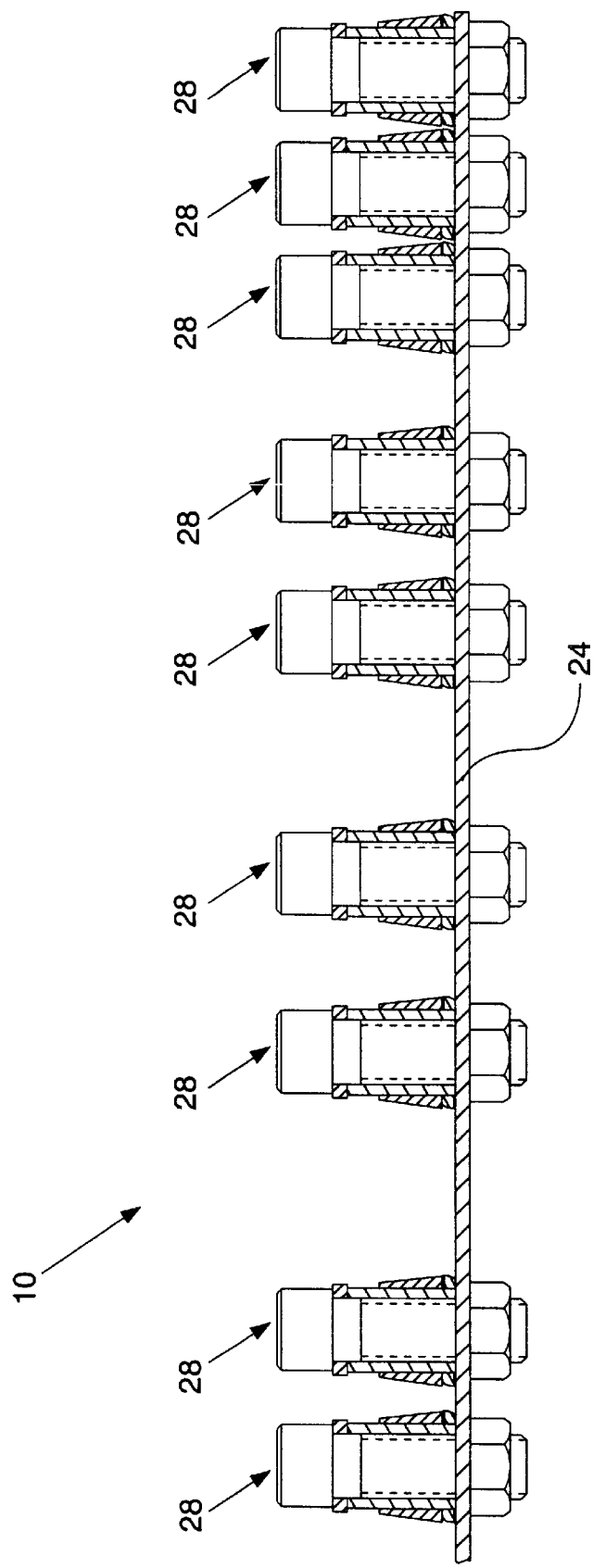

CONE DRIVE POWER TRAIN CONNECTION

Technical Field

This invention relates generally to a power train connection and more particularly to a power train connection that utilizes conical shaped members to align and drive between an engine and a transmission.

Background Art

Typically, engine to transmission power train connections are made through a series of bolts or similar fasteners. The series of bolts threadably fasten an engine flywheel to a torque converter/transmission assembly or directly to the transmission, depending on the type of transmission being connected. This method of bolting the engine flywheel to the transmission proves to be a particularly challenging and time consuming task especially when the components being connected are quite large.

For example, when a large engine is connected to a suitably sized transmission, as many as twelve or more bolts may be used to connect the two components. Adjusting the bolt holes into alignment is difficult because of the large mass of both the engine and transmission. Additionally, if a bolt is dropped in the process of connecting the engine and transmission, it is typically difficult to retrieve due to limited space between the components.

The present invention is directed to overcoming one or more of the problems as set forth above.

Disclosure of the Invention

In the present invention, a cone drive apparatus is adapted for aligning and drivingly engaging an engine to a transmission. The engine has an output member and the transmission has an input member.

The cone drive apparatus includes an adapter plate having at least one conical recess disposed therein. The adapter plate is mounted to the input member of the transmission.

A flex plate is mounted to the output member of the engine and at least one hole is disposed within the flex plate.

At least one conical drive assembly is fastened to the flex plate. The conical drive assembly is adapted for alignment of and driving engagement with the conical recess disposed within the adapter plate.

BRIEF DESCRIPTION OF THE DRAWINGS

FIG. 1 is a diagrammatic representation of a cone drive apparatus of the present invention in driving engagement between an engine and a transmission;

FIG. 2 is an enlarged diagrammatic view of the cone drive apparatus shown in FIG. 1; and, FIG. 3 is a diagrammatic representation showing a plurality of conical drive assemblies of the cone drive apparatus of FIGS. 1 and 2 mounted to a flex plate of the present invention.

BEST MODE FOR CARRYING OUT THE INVENTION

Referring to FIGS. 1 and 2, a cone drive apparatus 10 is adapted for aligning and drivingly engaging an engine 12 to a transmission 14. The engine 12 has an output member 16 and the transmission 14 has an input member 18.

An adapter plate 20 is mounted to the input member 18 of the transmission 14. At least one conical recess 22 is disposed within the adapter plate 20.

A flex plate 24 is mounted to the output member 16 of the engine 12 and at least one hole 26 is disposed within the flex plate 24.

At least one conical drive assembly 28 is fastened to the flex plate 24. The conical drive assembly 28 is adapted for alignment of and driving engagement with the conical recess 22 disposed within the adapter plate 20.

In the preferred embodiment, the cone drive apparatus 10 includes a plurality of conical drive assemblies 28 fastened to the flex plate 24 as shown in FIG. 3. The plurality of conical drive assemblies 28 are adapted for alignment of and driving engagement with a plurality of mating conical recesses 22 disposed within the adapter plate 20.

Referring now to FIG. 2, the conical drive assembly 28 includes a conical shaped member 30 located adjacent the flex plate 24. The conical shaped member 30 has a first end 32 and a second end 34. A tapered outer surface 36 extends between the first and second ends 32,34 and a bore 38 is defined within the conical shaped member 30. The bore 38 extends axially from the first end 32 to the second end 34.

The conical drive assembly 28 also includes at least one sleeve post 40 fastened to the flex plate 24. The sleeve post 40 has a first end portion 42, a second end portion 44, an annular outer surface 46, and an inner bore 48 defined within the sleeve post 40. The inner bore 48 extends axially from the first end portion 42 to the second end portion 44. The annular outer surface 46 is adapted for sliding engagement with the bore 38 of the conical shaped member 30.

To facilitate the sliding engagement between the annular outer surface 46 of the sleeve post 40 and the bore 38 of the conical shaped member 30, one or both of the annular outer surface 46 and the bore 38 may be coated with a suitable lubricant such as grease.

Furthermore, the sleeve post 40 has a shoulder portion 50 located adjacent the first end portion 42. As shown in FIG. 2, the shoulder portion 50 is formed by a retainer 52. The retainer 52 is located adjacent the first end portion 42 of the sleeve post 40. It is recognized that the shoulder portion 50 can be formed as an integral part of the sleeve post 40 without departing from the essence of the invention.

Also included in the conical drive assembly 28 is a spring means 54 located between the flex plate 24 and the second end 34 of the conical shaped member 30. The spring means 54 is adapted to urge the conical shaped member 30 into intimate contact with the conical recess 22 of the adapter plate 20.

The spring means 54 shown in FIG. 2 is a wave spring or Belleville washer. However, it is recognized that other spring configurations such as coil, helical, or other spring means may be used without departing from the essence of the invention.

The conical drive assembly 28 is fastened to the flex plate 24 by a fastener 56. The fastener 56 extends through the inner bore 48 of the sleeve post 40 and the hole 26 disposed within the flex plate 24. The fastener 56 shown includes a bolt 58 and a nut 60. The bolt 58 extends through the sleeve post 40 and the flex plate 24 and is adapted for threaded engagement with the nut 60. The nut 60 is attached to the flex plate 24 by an interference fit between the nut 60 and the hole 26 of the flex plate 24.

It is recognized that other fasteners may be used instead of the bolt 58 and nut 60 to fasten the conical drive assembly 28 to the flex plate 24. Similarly, the nut 60 may be attached to the flex plate 24 by welding or other means known in the art, other than the interference fit disclosed above, without departing from the essence of the invention.

INDUSTRIAL APPLICABILITY

The cone drive apparatus 10 of this invention functions to align and drivingly engage the engine 12 to the transmission 14 by way of the conical drive assembly 28 and the conical recess 22. The conical drive assembly 28 is fastened to the flex plate 24, and the flex plate 24 is fastened to the output member 16 of the engine 12. The transmission input member 18 is equipped with the adapter plate 20 which has the conical recess 22 disposed therein.

The engine 12 and transmission 14 are aligned to one another by bringing the conical drive assembly 28 into generally axial alignment with the conical recess 22. As the engine 12 and transmission 14 are brought together axially, the conical shaped member 30 of the conical drive assembly 28 begins to engage the conical recess 22 of the adapter plate 20. As the engine 12 and transmission 14 are brought into closer axial proximity, the tapered outer surface 36 of the conical shaped member 30 contacts the conical recess 22 which allows the output member 16 of the engine 12 and input member 18 of the transmission 14 to adjust radially to one another to bring the components into alignment.

Once aligned, the engine 12 and transmission 14 are brought into final axial contact and the two components are suitably fastened together by normal means as is well known in the art.

The cone drive apparatus 10 is then capable of drivingly engaging the engine 12 to the transmission 14. A rotational output from the output member 16 of the engine 12 results in a rotational input to the input member 18 of the transmission 14. The conical shaped member 30 of the conical drive assembly 28 is axially urged into intimate contact with the conical recess 22 of the adapter plate 20 by the spring means 54. The spring means 54 assures solid driving engagement between the engine 12 and the transmission 14 by way of the cone drive apparatus 10.

Other aspects, objects and advantages of this invention can be obtained from a study of the drawings, the disclosure and the appended claims.

What is claimed is:

1. A cone drive apparatus adapted for aligning and drivingly engaging an engine to a transmission, the engine having an output member, the transmission having an input member, the cone drive apparatus comprising:

an adapter plate mountable to the input member of the transmission, the adapter plate having a plurality of conical recesses disposed therein;

a flex plate mountable to the output member of the engine, the flex plate having a plurality of holes disposed therein; and, a conical drive assembly fastened to the flex plate, the conical drive assembly being aligned for driving engagement with one of the conical recesses disposed within the adapter plate, the conical drive assembly includes a conical shaped member located adjacent the flex plate, the conical shaped member having a first end and a second end, a tapered outer surface extending between the first and second ends, and a bore defined within the conical shaped member, the bore extending axially from the first end to the second end, the conical drive assembly further includes at least one sleeve post fastened to the flex plate and having a first end portion and a second end portion, an annular outer surface and an inner bore defined within the sleeve post, the inner bore extending axially from the first end portion to the second end portion, the annular outer surface being adapted for sliding engagement with the bore of the conical shaped member.

2. The cone drive apparatus of claim 1 wherein the sleeve post has a shoulder portion located adjacent the first end portion.

3. The cone drive apparatus of claim 2 wherein the shoulder portion is formed by a retainer, the retainer being located adjacent the first end portion of the sleeve post.

4. The cone drive apparatus of claim 1 wherein the conical drive assembly includes a spring means located between the flex plate and the second end of the conical shaped member, the spring means being adapted to urge the conical shaped member into intimate contact with the conical recess of the adapter plate.

5. The cone drive apparatus of claim 1 wherein the conical drive assembly is fastened to the flex plate by a fastener extending through the inner bore of the sleeve post and the hole disposed within the flex plate.

6. The cone drive apparatus of claim 5 wherein the fastener includes a bolt and a nut, the bolt extending through the sleeve post and flex plate and adapted for threaded engagement with the nut.

7. The cone drive apparatus of claim 6 wherein the nut is attached to the flex plate with an interference fit.

8. A cone drive apparatus for aligning and drivingly connecting an output member of an engine to an input member of a transmission, the cone drive apparatus comprising:

an adapter plate positioned between the output member of the engine and the input member and being removably attached to the input member, the adapter plate having a plurality of conical recesses therein;

a flex plate mountable to the output member of the engine and includes a plurality of holes disposed therein, the flex plate includes a plurality of nuts positioned within the holes in the flex plate;

a conical drive assembly being positioned within each of the conical recesses of the adapter plate to align the conical drive with the holes in the flex plate;

a spring positioned between the flex plate and the conical drive assembly to urge the conical drive assembly into contact with the conical recess of the adapter plate; and a fastener extending through the conical drive assembly and being threadably fastened to the nut of the flex plate for aligning and drivingly connecting the flex plate to the adapter plate.

* * * * *